(12) United States Patent
Kono et al.

(10) Patent No.: US 8,422,493 B2
(45) Date of Patent: Apr. 16, 2013

(54) NETWORK RELAY DEVICE AND NETWORK RELAY METHOD

(75) Inventors: Tomohiko Kono, Yokohama (JP); Shinichi Akahane, Hachioji (JP); Takao Nara, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 630 days.

(21) Appl. No.: 12/475,853

(22) Filed: Jun. 1, 2009

(65) Prior Publication Data

US 2009/0304008 A1 Dec. 10, 2009

(30) Foreign Application Priority Data

Jun. 4, 2008 (JP) .................................. 2008-147131

(51) Int. Cl.
*H04L 12/56* (2006.01)
(52) U.S. Cl.
USPC ......................................................... 370/389
(58) Field of Classification Search .................. 370/390, 370/431, 432, 389, 392
See application file for complete search history.

(56) References Cited

U.S. PATENT DOCUMENTS

| 7,672,293 B2 * | 3/2010 | Gooch et al. ................... 370/351 |
| 2007/0041373 A1 * | 2/2007 | Lor et al. ....................... 370/356 |
| 2009/0300178 A1 * | 12/2009 | Saunderson et al. .......... 709/224 |

FOREIGN PATENT DOCUMENTS

| JP | 2000-174796 A | 6/2000 |
| JP | 2004-104355 A | 4/2004 |
| JP | 2005-198090 A | 7/2005 |
| JP | 2006-262378 A | 9/2006 |

OTHER PUBLICATIONS

Configuring DHCP Snooping, IP Source Guard, and IPSG for Static Hosts, Chapter 35, Software Configuration Guide-Release 12.2(37)SG, pp. 35-1-35-22, Dated year 2007.
Configuring Port Security, Chapter 33, Software Configuration Guide-Release 12.2(37)SG, pp. 33-1-33-32, Dated year 2007.

* cited by examiner

*Primary Examiner* — Dang Ton
*Assistant Examiner* — Kevin Lee
(74) *Attorney, Agent, or Firm* — Mattingly & Malur, PC

(57) ABSTRACT

A network relay device for relaying communication for a regular terminal via a port includes an acquiring module, a regular terminal information storing module, and a determination process module. The acquiring module acquires a regular layer 2 address, a regular layer 3 address, regular VLAN information representing a VLAN assigned to the regular terminal, and regular port information representing a port to which the regular terminal is connected. The regular terminal information storing module stores regular terminal information representing a combination of the acquired regular layer 2 address, the regular layer 3 address, the regular VLAN information, and the regular port information. The determination process module determines whether the combination of source layer 2 address, source layer 3 address, assigned VLAN, and reception port of target frame data received via the port is stored as the regular terminal information.

18 Claims, 16 Drawing Sheets

NETWORK RELAY DEVICE AND NETWORK RELAY METHOD

CROSS REFERENCE TO RELATED APPLICATIONS

The present application claims the priority based on a Japanese Patent Application No. 2008-147131 filed on Jun. 4, 2008, the disclosure of which is hereby incorporated by reference in its entirety.

BACKGROUND

1. Technical Field

The present invention relates to a network relay device and a network relay method; and particularly to a network relay device and a network relay method adapted to detect an irregular terminal on a network.

2. Description of Related Art

DHCP (Dynamic Host Configuration Protocol) is a method used for allocating an IP address to a terminal automatically. DHCP has been standardized by the IETF (Internet Engineering Task Force) and is published as RFC (Request for Comments) 2131. By allocating an IP address to an administered terminal only while not allocating an IP address to an irregular terminal, DHCP can prevent an irregular terminal from connecting to a network. However, an irregular terminal could still connect to a network, through manual setting of its IP address.

Technologies for preventing communication by an irregular terminal whose IP address has been set manually have been proposed in the past.

According to this technology, a DHCP protocol which is exchanged among a DHCP server and a terminal is monitored; and information about a terminal to which an address has been allocated by DHCP is managed through its IP address and MAC address, enabling communication only with a terminal that matches the managed information.

Other technologies besides the technology mentioned above for preventing communication by an irregular terminal whose IP address has been set manually have been proposed in the past.

According to this technology, a DHCP protocol which is exchanged among a DHCP server and a terminal is monitored (DHCP snooping), filtering (IP Source Guard) utilizing an IP address, a port and a VLAN (Virtual Local Area Network) of a terminal to which an address has been allocated by DHCP is executed, and filtering (Port Security) utilizing a MAC address, a port and a VLAN of a terminal to which an address has been allocated by DHCP is executed.

However, technologies mentioned above do not take into account the possibility that a MAC address of a terminal could be set manually. Thus, with the technologies, there exists a risk that an irregular terminal having a manually set IP address and MAC address identical to those of a terminal for which addresses have been allocated by DHCP is able to connect to a different port of the network relay device or to a different VLAN, so that irregular communication cannot be prevented.

According to the technologies, the IP address, which is the layer 3 address, and the MAC address, which is the layer 2 address, are handled separately. There accordingly exists a risk that a terminal having the DHCP-allocated IP address of a first terminal and the DHCP-allocated MAC address of a second terminal could not be prevented from irregular communication.

Thus, in consideration of the possibility that the MAC address of a terminal could be set manually, there exists a need to more carefully identify irregular communication by an irregular terminal.

SUMMARY

An object of the present invention is to provide a technology adapted to more carefully identify irregular communication by an irregular terminal.

In one aspect of the present invention, there is provided a network relay device for relaying communication for a regular terminal via a port. The network relay device comprises an acquiring module, a regular terminal information storing module, and a determination process module. The acquiring module acquires a regular layer 2 address representing a layer 2 address allocated to the regular terminal, a regular layer 3 address representing a layer 3 address allocated to the regular terminal, regular VLAN information representing a VLAN assigned to the regular terminal, and regular port information representing a port to which the regular terminal is connected. The regular terminal information storing module stores regular terminal information representing a combination of the acquired regular layer 2 address, the regular layer 3 address, the regular VLAN information, and the regular port information. The determination process module determines whether the combination of source layer 2 address, source layer 3 address, assigned VLAN, and reception port of target frame data received via the port is stored as the regular terminal information in the regular terminal information storing module. According to this network relay device, target frame data for which the combination of the source layer 2 address, the source layer 3 address, the assigned VLAN, and the reception port of the target frame data does not match the combination of the regular layer 2 address, the regular layer 3 address, the regular VLAN, and the regular port information that has been stored in the storing module as the regular terminal information will be identified as data belonging to an irregular terminal, whereby communication by an irregular terminal can be identified more carefully.

The present invention can be realized in various aspects. For example, the present invention can be realized in aspects such as a method of controlling a network relay device, a network relay method, or a method of controlling a network relay system. The present invention can also be realized in aspects such as a computer program that controls a network relay device or a network relay system, a recording medium on which such computer program is recorded, or a computer program product that includes this recording medium.

These and other objects, features, aspects, and advantages of the present invention will become more apparent from the following detailed description of the preferred embodiments with the accompanying drawings.

DESCRIPTION OF THE PREFERRED EMBODIMENT

A. Embodiment 1

Figure 1:
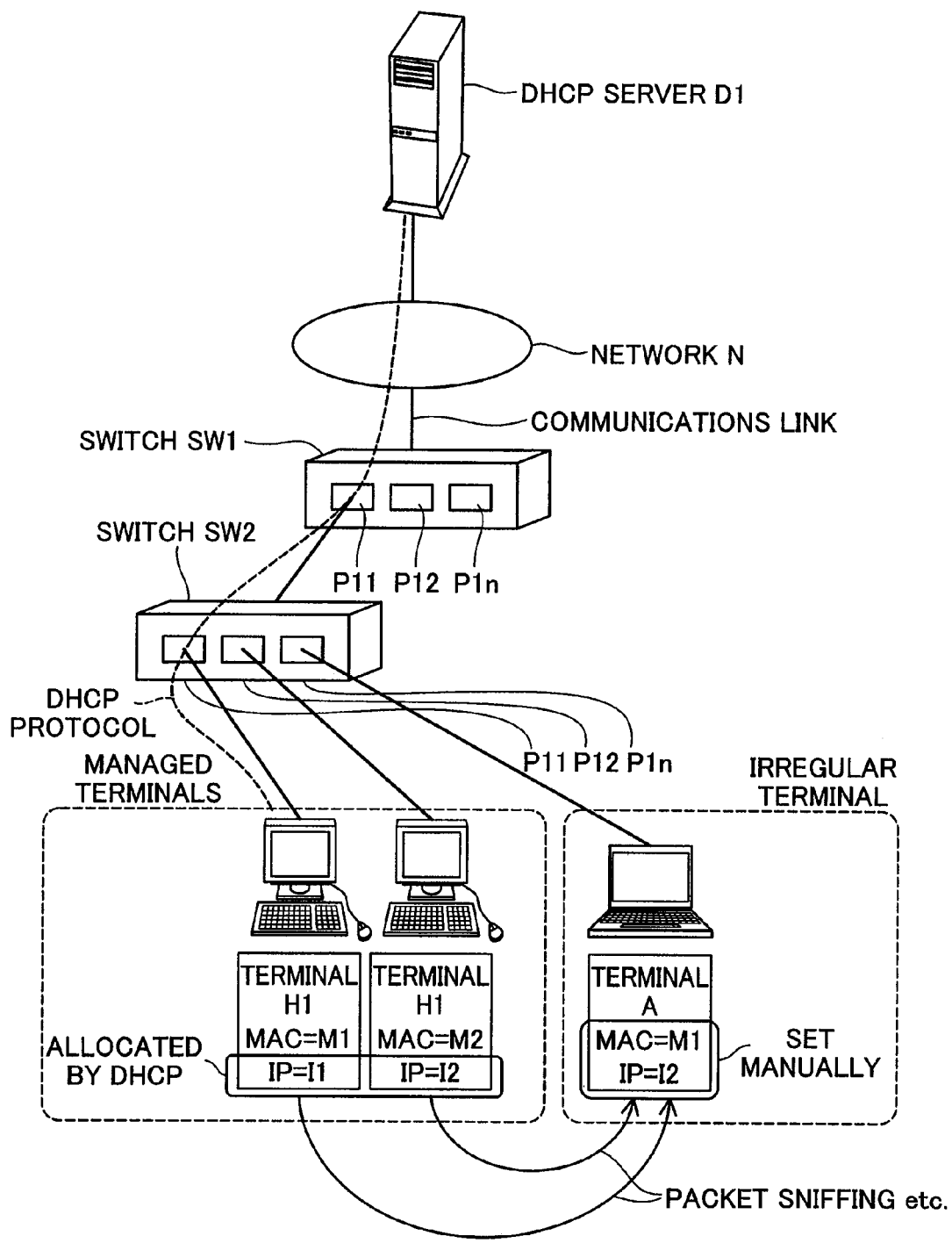
FIG. 1 is a diagram depicting a configuration of a network system of Embodiment 1.

FIG. 1 is a diagram depicting a configuration of a network system of Embodiment 1. The network system of Embodiment 1 includes a DHCP server D1, switches SW1, SW2 provided as network relay devices, terminals H1 and H2, and an irregular terminal A. To simplify the discussion, network relay devices that are connected to other ports of the network relay device SW1 are not shown. In FIG. 1, the terminals H1 and H2 are terminals that are allocated IP addresses by DHCP (hereinafter also referred to as regular terminals). Irregular terminal A, on the other hand, has a MAC address that has been manually set to the MAC address of terminal H1 and an IP address manually set to the IP address of terminal H2, which addresses have been acquired through means such a packet sniffing. The irregular communication prevention method which is a feature of Embodiment 1 is an operation that takes place in the network relay device SW1. The network relay device SW2 is a switch that lacks a filtering function for preventing irregular communication, and is simply connected for network layering purposes.

The network relay devices SW1 and SW2 include a plurality of ports P11 to P1n (n is an integer equal to 2 or greater). The network relay device SW1 also sets a plurality of VLANs V11 to P1n (n is an integer equal to 2 or greater).

Figure 2:
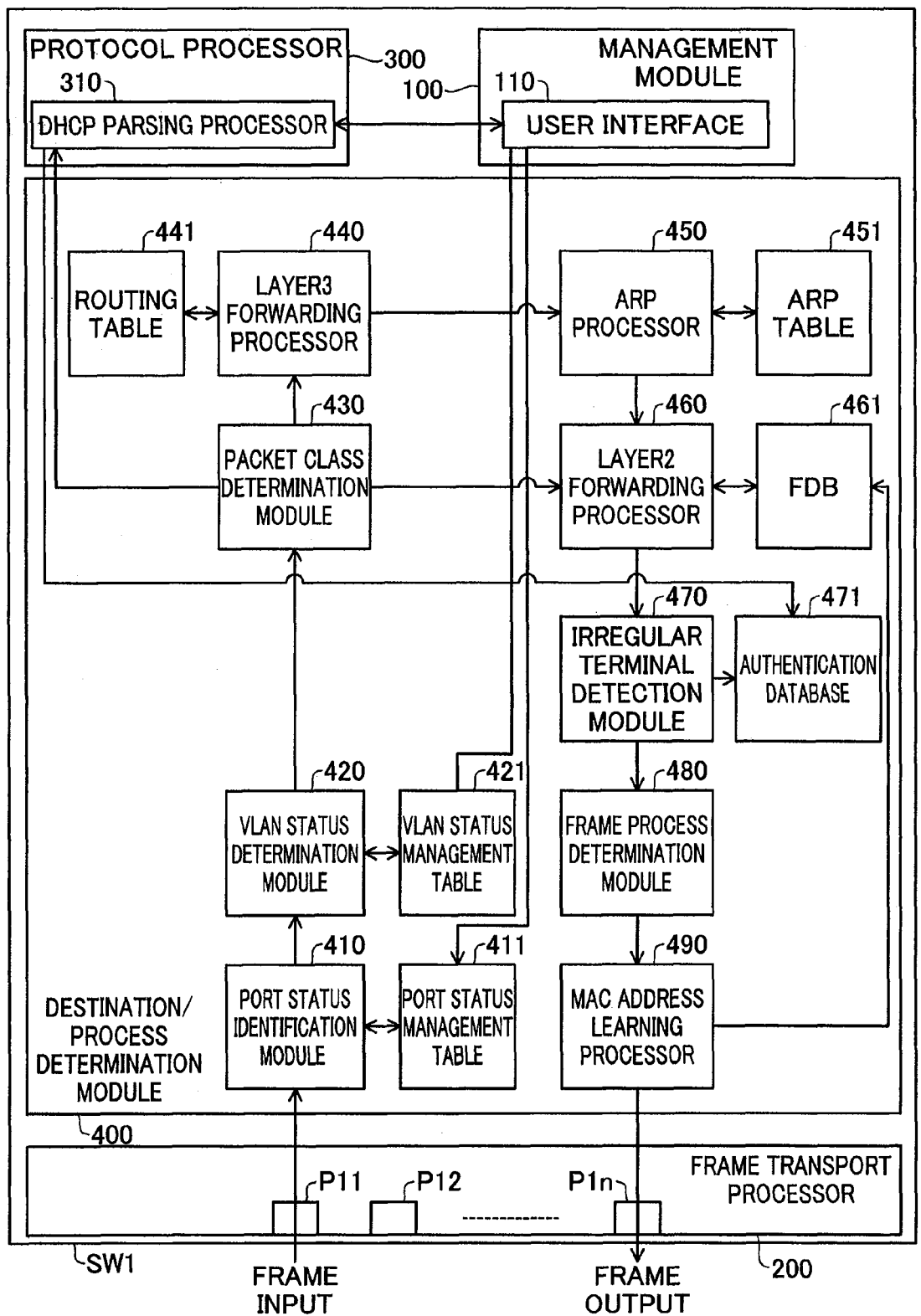
FIG. 2 is a block diagram depicting the configuration of the network relay device SW1 in Embodiment 1.

FIG. 2 is a block diagram depicting the configuration of the network relay device SW1 in Embodiment 1. The network relay device SW1 has a management module 100, a frame transport processor 200, a protocol processor 300, and a destination/process determination module 400. The management module 100 has a user interface 110 adapted to receive instructions from a user. The protocol processor 300 carries out processes relating to protocols such as routing protocols and ARP (Address Resolution Protocol); it will not be discussed in detail. The protocol processor 300 has a DHCP parsing processor 310 for carrying out processes relating to DHCP.

The destination/process determination module 400 includes a port status identification module 410, a port status management table 411, a VLAN status determination module 420, a VLAN status management table 421, a packet class determination module 430, a layer 3 (L3) forwarding processor 440, a routing table 441, an ARP processor 450, an ARP table 451, a layer 2 (L2) forwarding processor 460, an FDB (Forwarding Data Base) 461, an irregular terminal detection module 470, an authentication database 471, a frame process determination module 480, and a MAC address learning processor 490.

Figure 3:
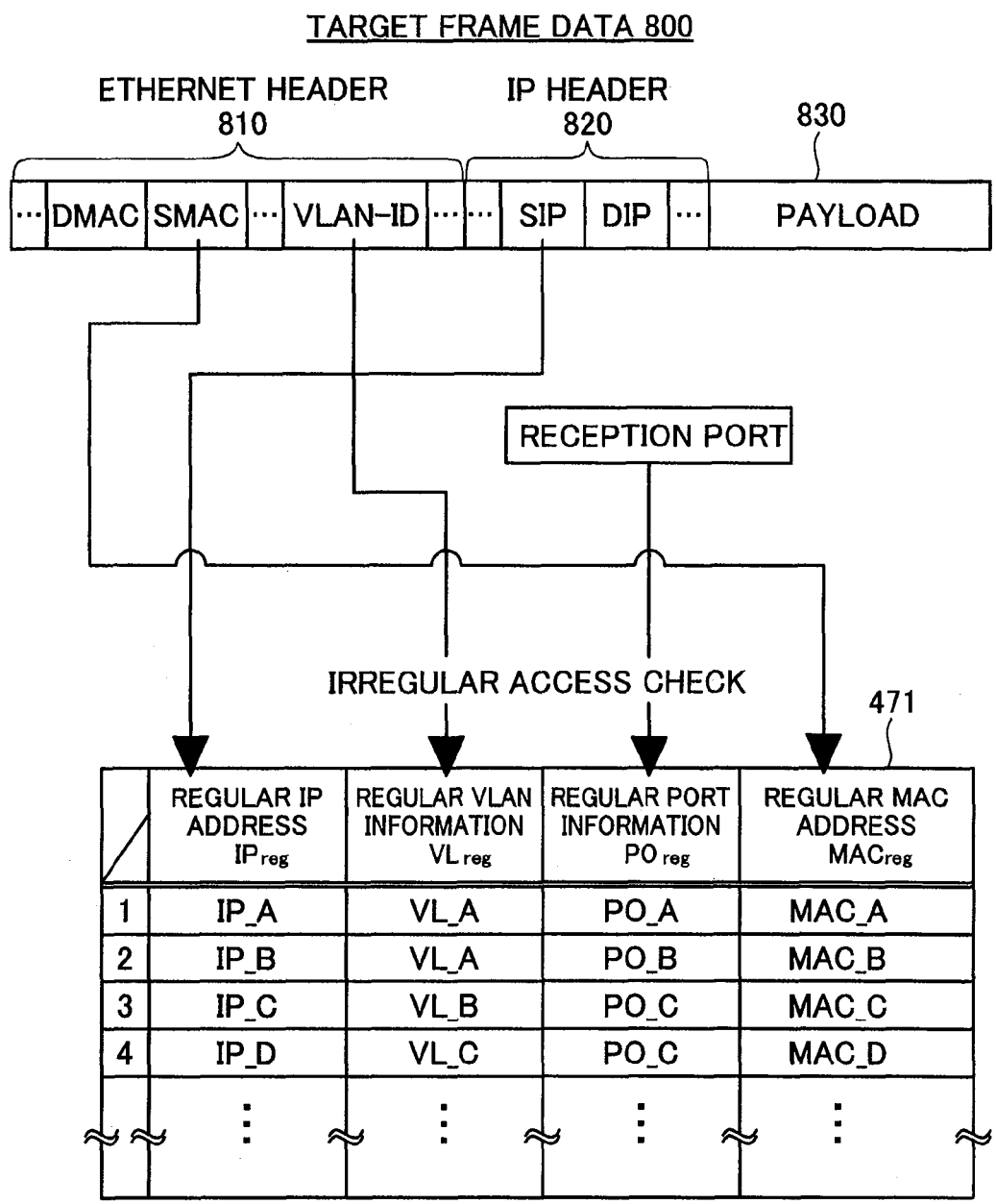
FIG. 3 is a diagram depicting in overview an irregular terminal detection method in Embodiment 1.

FIG. 3 is a diagram depicting in overview an irregular terminal detection method in Embodiment 1. Prior to describing the specific operations of the constituent elements of the network relay device SW1 mentioned above, a brief overview of the irregular terminal detection method will be presented. Target frame data 800 for which the transport process is primarily be carried out by the network relay device SW1 includes an Ethernet header 810, an IP header 820, and a payload 830. The Ethernet header 810 describes information that is used by the layer 2 protocol (in the present embodiment, Ethernet). The Ethernet header 810 includes a destination MAC address (hereinafter DMAC), a source MAC address (hereinafter SMAC), and an VLAN-ID. The VLAN-ID is information representing the VLAN (assigned VLAN) being used for the target frame data 800. The IP header 820 is a header that describes information used in processes taking place in the network layer. The IP header 820 includes a source IP address (hereinafter SIP) and a destination IP address (hereinafter DIP). The payload represents the data proper which is the object of the transport process.

The authentication database 471 describes information for regular terminals (regular terminal information) whose IP addresses have been allocated by DHCP. The regular terminal information described in the authentication database 471 includes, for each individual regular terminal, an allocated IP address (regular IP address $IP_{REG}$), regular VLAN information $VL_{REG}$, regular port information $PO_{REG}$, and a regular terminal MAC address (regular MAC address $MAC_{REG}$). The regular VLAN information $VL_{REG}$ indicates the assigned VLAN (regular VLAN) of a regular terminal. The regular port information $PO_{REG}$ indicates the port (regular port) that communicates with the regular terminal.

The network relay device SW1 determines whether the target frame data 800 is regular data sent from a regular terminal, or irregular data sent from an irregular terminal. Specifically, the network relay device SW1 determines whether the combination of source IP address of the target frame data 800, assigned VLAN, reception port, and source MAC address of the target frame data 800 matches any of the combinations of regular terminal regular IP address $IP_{REG}$, regular VLAN information $VL_{REG}$, regular port information $PO_{REG}$, and regular MAC address $MAC_{REG}$ that are described in the authentication database 471. In the event that these combinations match, the target frame data 800 will be designated as data sent from a regular terminal, and a normal transport process will be carried out by the network relay device SW1. On the other hand, in the event that these combinations do not match, the network relay device SW1 will designate the target frame data 800 as having been sent by an irregular terminal and will discard the data.

Following is a detailed description of operations of the network relay device SW1.

Network Relay Device Settings

Figure 4:
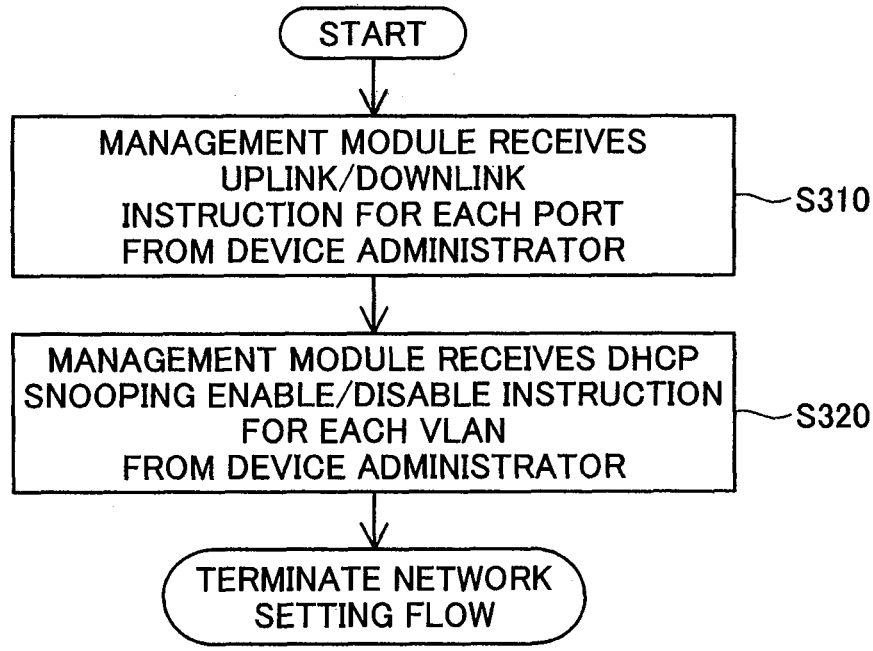
FIG. 4 is a flowchart showing the process flow for setting up the network relay device SW1 to conform to the network configuration, and initiating detection of irregular terminals.

FIG. 4 is a flowchart showing the process flow for setting up the network relay device SW1 to conform to the network configuration, and initiating detection of irregular terminals. The management module 100 of the network relay device SW1 receives an uplink/downlink instruction for each port from the device administrator (Step S310). An uplink port refers to a port to which the DHCP server D1 is connected. A port to which the DHCP server D1 is connected via another switch is also considered as an uplink port. A downlink port refers to a port to which the DHCP server D1 is not connected. Regular terminals that have been allocated IP addresses by the DHCP server D1 is connected to downlink ports of switches. Next, the management module 100 of the network relay device SW1 receives from the device administrator a DHCP snooping enable/disable instruction for each VLAN (Step S320). This instruction is input to the network relay device SW1 by the device administrator, through a management terminal (not shown) which is connected to the network relay device SW1.

Figure 5:
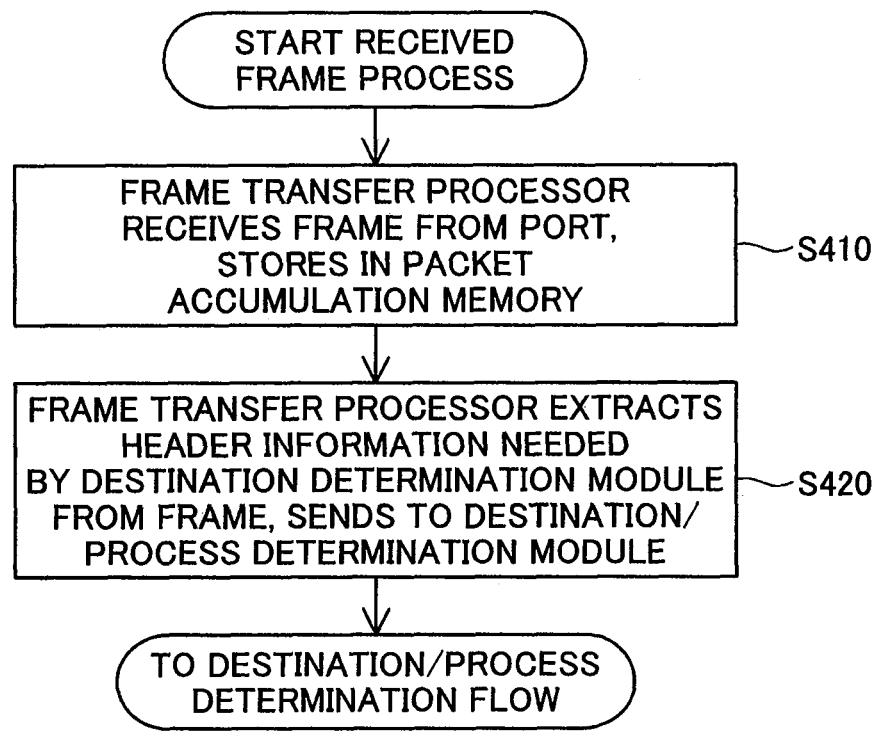
FIG. 5 is a first flowchart depicting the process steps of a frame data reception process.

Frame Data Reception Process:

FIG. 5 is a first flowchart depicting the process steps of a frame data reception process. From the port P11 to P1n at which the target frame data 800 has arrived, the frame transport processor 200 receives the frames and saves them in a frame accumulation memory, not shown (Step S410). From the received target frame data 800, the frame transport processor 200 extracts header information needed by the destination/process determination module 400, e.g. the destination MAC address, source MAC address, VLAN-ID, destination IP address, and source IP address, and send this information to the destination/process determination module 400 (Step S420).

From a network reliability standpoint, it is preferable for control frame data for DHCP etc. to be given higher priority in control than ordinary frame data. For this reason, in preferred practice, the frame transport processor 200 determines whether the received frame data is control frame data for DHCP etc., and when saving data to the frame accumulation memory gives priority to data that has been determined to be control frame data for DHCP etc.

Figure 6:
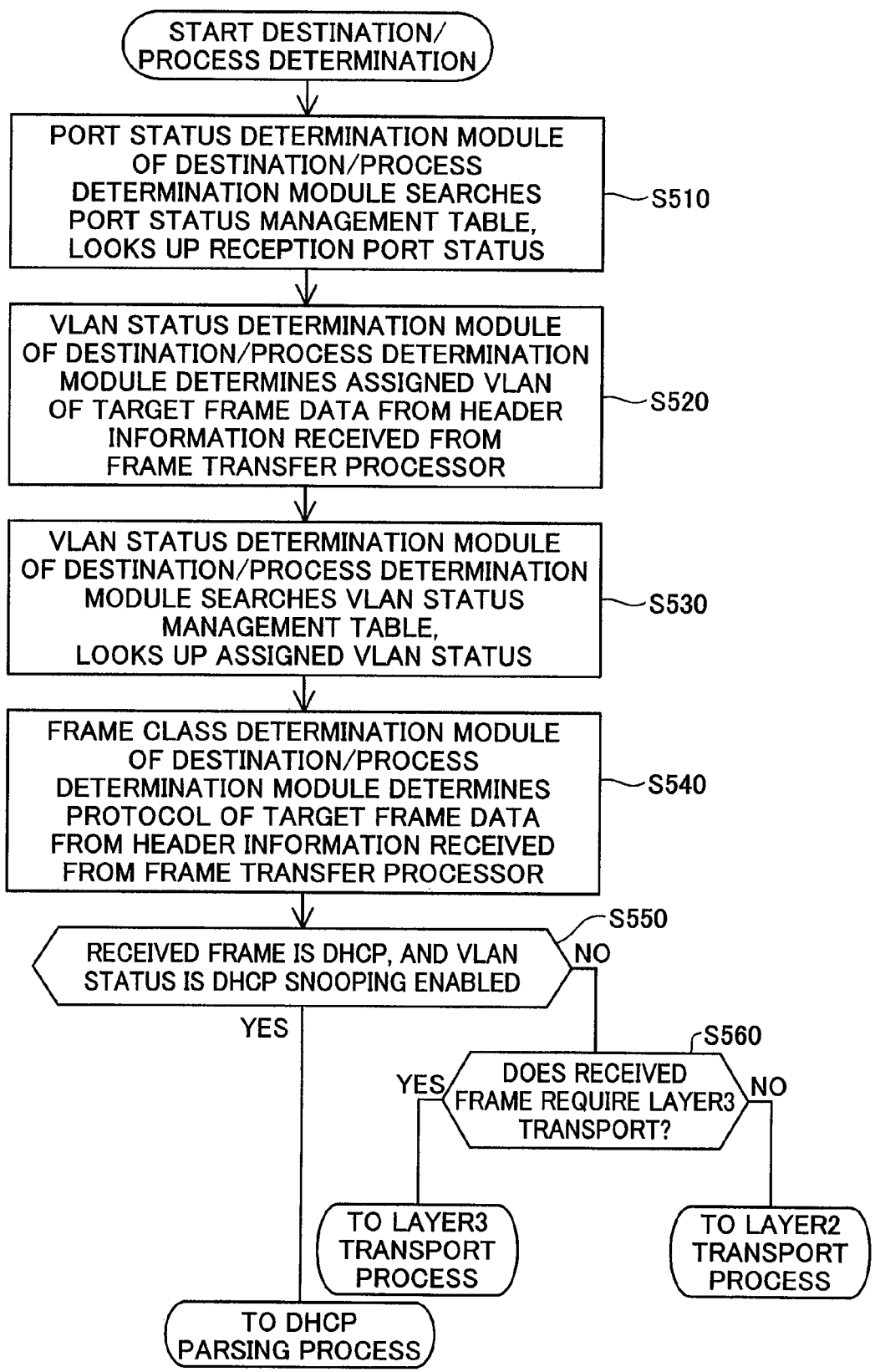
FIG. 6 is a second flowchart depicting the process steps of the frame data reception process.

FIG. 6 is a second flowchart depicting the process steps of the frame data reception process. Next, the port status identification module 410 of the destination/process determination module 400 looks up in the port status management table 411 and check the status of the reception port (Step S510). It is thereby recognized whether the reception port is an uplink port or a downlink port, for example.

From the header information that has been received from the frame transfer processor, the VLAN status determination module 420 of the destination/process determination module 400 determines the assigned VLAN of the target frame data 800 (Step S520). The VLAN status determination module 420 of the destination/process determination module 400 then looks up in the VLAN status management table 421 and checks the status of the assigned VLAN (Step S530). It is thereby recognized whether DHCP snooping is enabled for the VLAN, for example.

The packet class determination module 430 of the destination/process determination module 400 then determines the protocol of the target frame data 800, from the header information that is received from the frame transport processor 200 (Step S540). If the frame type so determined is a DHCP frame, and if the VLAN status of the assigned VLAN has been set to enable DHCP snooping, the process proceeds to the DHCP parsing process (Step S550: YES). On the other hand, if the frame type so determined is not a DHCP frame, or if the VLAN status of the assigned VLAN has been set to disable DHCP snooping, (Step S550: NO), it is then determined whether layer 3 transport is needed (Step S560). If layer 3 transport is needed, the process proceeds to the layer 3 transport process flow (Step S560: YES), whereas if layer 3 transport is not needed, the process proceeds to the layer 2 transport process flow (Step S560: NO).

Figure 7:
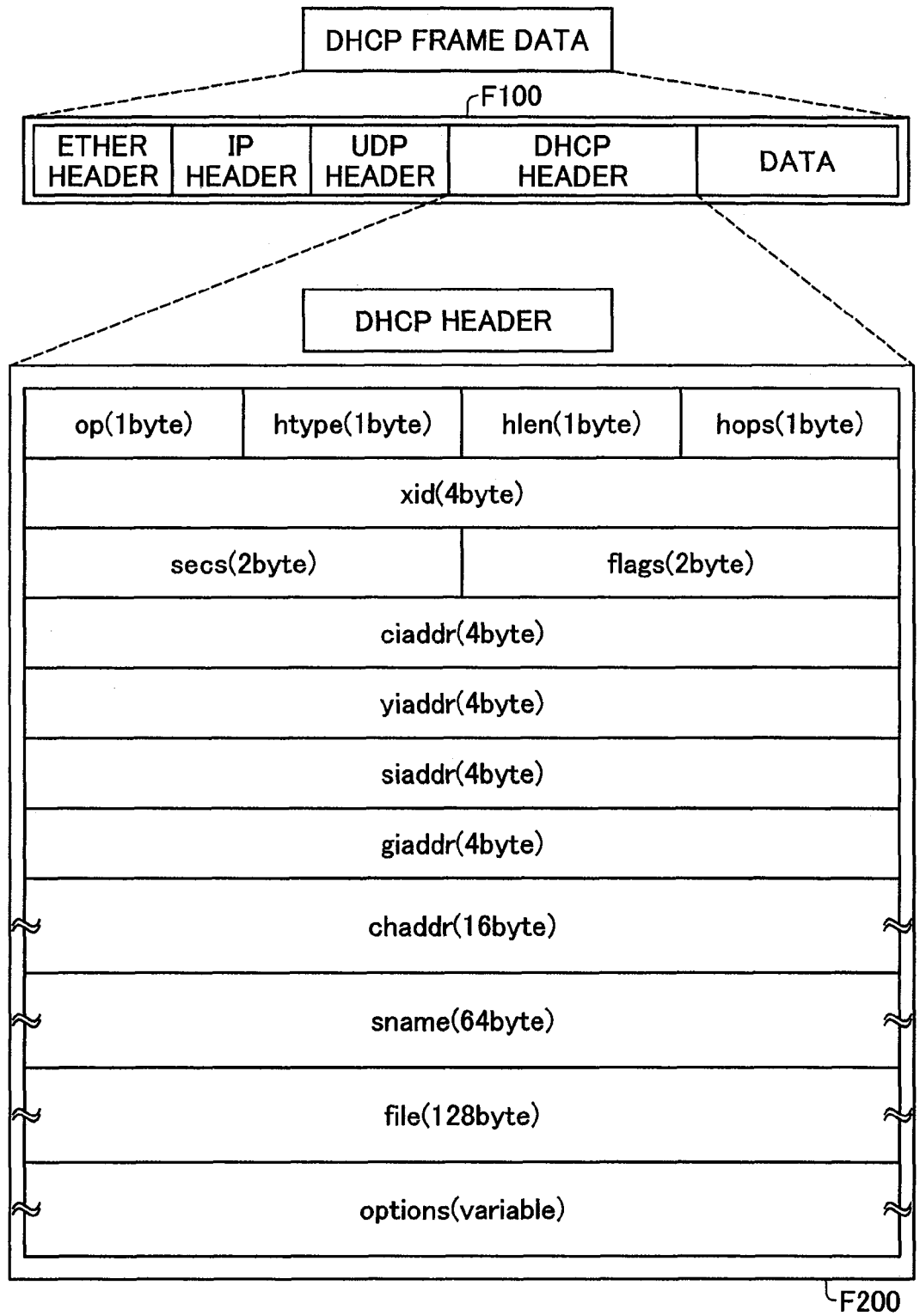
FIG. 7 is an illustration depicting DHCP frame data.

FIG. 7 is an illustration depicting DHCP frame data. The packet class determination module 430 of the destination/process determination module 400 determines whether the target frame data 800 is DHCP frame data F100 by inspecting the target frame data 800 to determine if there is a DHCP header F200 encapsulated with the Ethernet header, the IP header, and the UDP header.

Figure 8:
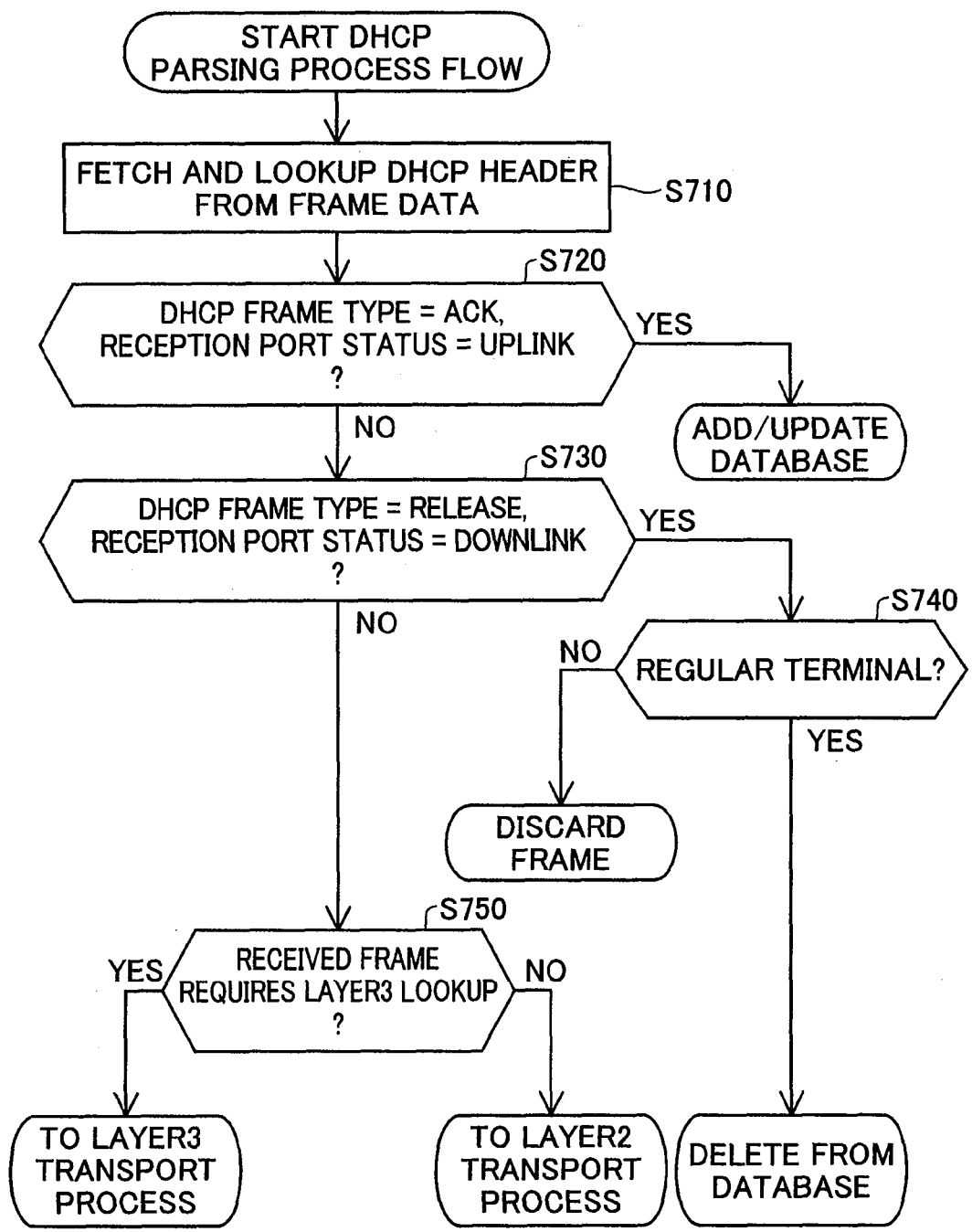
FIG. 8 is a flowchart depicting the process steps in a DHCP parsing process.

FIG. 8 is a flowchart depicting the process steps in a DHCP parsing process. In the DHCP parsing process, first, the DHCP header F200 is retrieved from the DHCP frame 100, and checked (Step S710). Next, it is determined whether the type of DHCP frame data is ACK, and whether the port status of the reception port is uplink (Step S720). If the determination is positive (Step S720: YES), information for the regular terminal that has been newly allocated an IP address is appended the authentication database 471 that manages the regular terminal, in the form of a combination of regular MAC address, regular IP address, assigned VLAN of the regular terminal, and the port for communicating with the regular terminal. The validity period of regular terminal information may be managed, and when the validity period expires, the registered information may be deleted automatically. For example, a validity period could be initialized in the event that setup is carried out again for a regular terminal that was managed previously. If on the other hand the determination is negative (Step S720: NO), it is determined whether the type of DHCP frame data is RELEASE, and whether the port status of the reception port is downlink (Step S730). If this determination is positive (Step S730: YES), the authentication database 471 is searched to ascertain if the terminal that sent the RELEASE has been set up therein (Step S740). If the search result shows that the terminal is registered in the authentication database 471 (Step S740: YES), the regular terminal information of the terminal that sent the RELEASE is deleted from the authentication database 471. If on the other hand the search result shows that the terminal is not registered in the authentication database 471 (Step S740: NO), the target frame data 800 is discarded. If the aforementioned determination is negative (Step S730: NO), it is then determined whether layer 3 transport is needed (Step S750). If layer 3 transport is needed, the process proceeds to the layer 3 transport process flow (Step S750: YES), whereas if layer 3 transport is not needed the process proceeds to the layer 2 transport process (Step S750: NO).

Regular terminal information registered in the authentication database 471 is saved in the form of a linked layer 2/3 database in which layer 2 information and layer 3 information are linked, for example.

Figure 9:
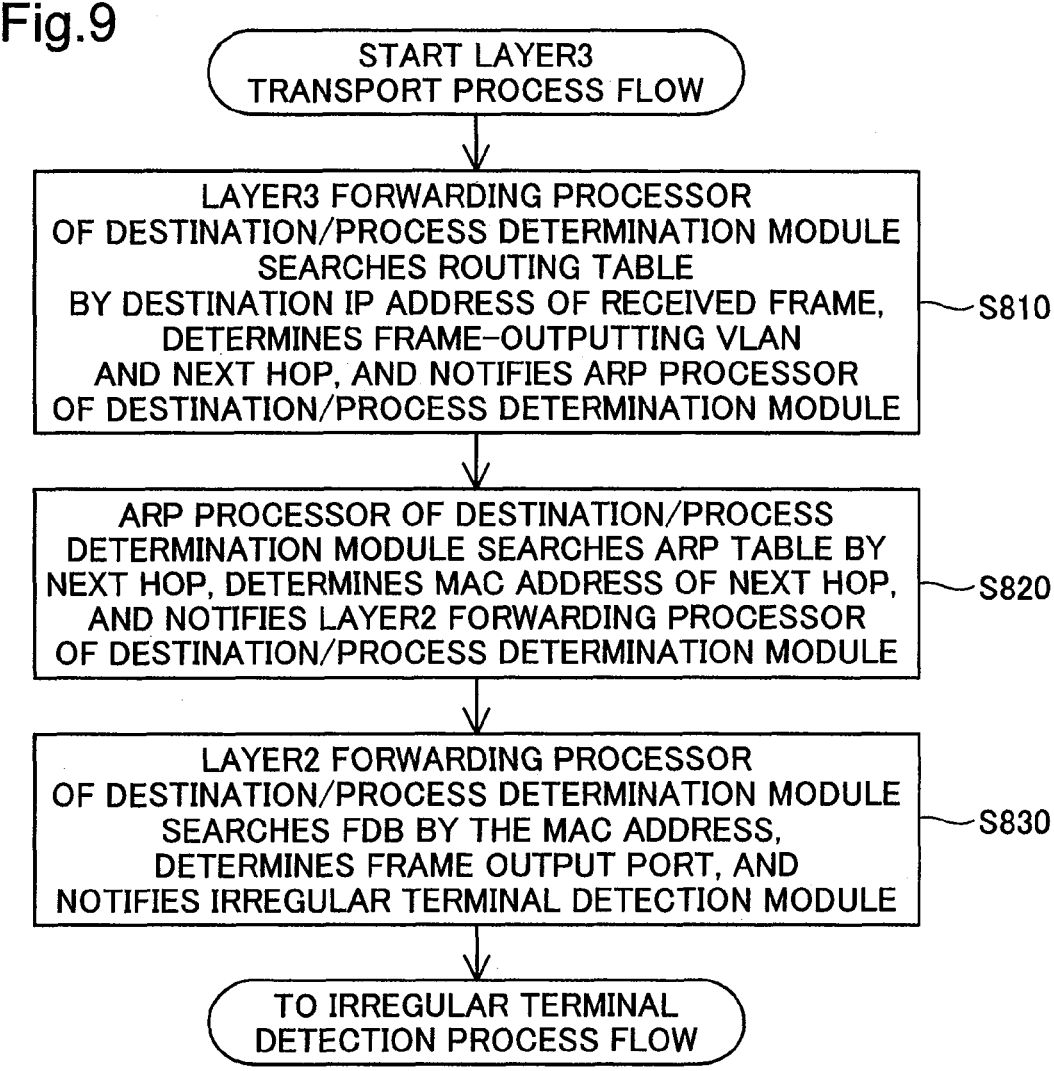
FIG. 9 is a flowchart depicting the process steps of a layer 3 transport process.

FIG. 9 is a flowchart depicting the process steps of a layer 3 transport process. The layer 3 forwarding processor 440 of the destination/process determination module 400 searches the routing table 431 by the destination IP address for the target frame data 800; and determines the VLAN that output the target frame data 800 (output VLAN) and the transport destination (Next Hop), and communicates this information to the ARP processor 450 of the destination/process determination module 400 (Step S810). Next, the ARP processor 450 of the destination/process determination module 400 searches the ARP table 451 by the communicated next hop; and determines the MAC address of the next hop and communicates this information to the layer 2 forwarding processor 460 of the destination/process determination module 400 (Step S820). The layer 2 forwarding processor 460 of the destination/process determination module 400 then searches the FDB 461 by the aforementioned MAC address, determines the output port of the target frame data 800, and communicates this information to the irregular terminal detection module 470 (Step S830).

Figure 10:
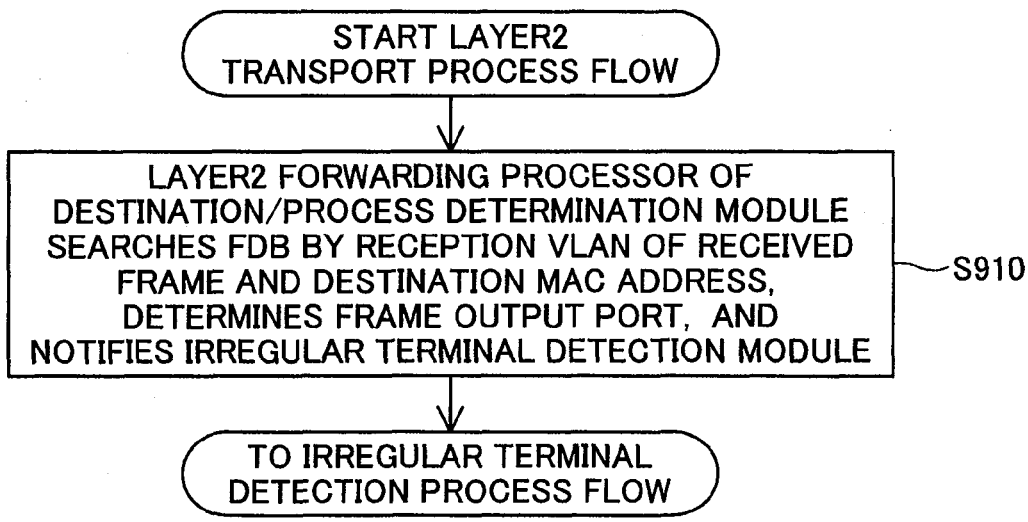
FIG. 10 is a flowchart depicting the process steps of a layer 2 transport process.

FIG. 10 is a flowchart depicting the process steps of a layer 2 transport process. The layer 2 forwarding processor 460 of the destination/process determination module 400 searches the FDB 461 by the assigned VLAN of the target frame data 800 and the destination MAC address, determines the output port of the target frame data 800, and communicates this information to the irregular terminal detection module 470 (Step S910).

Figure 11:
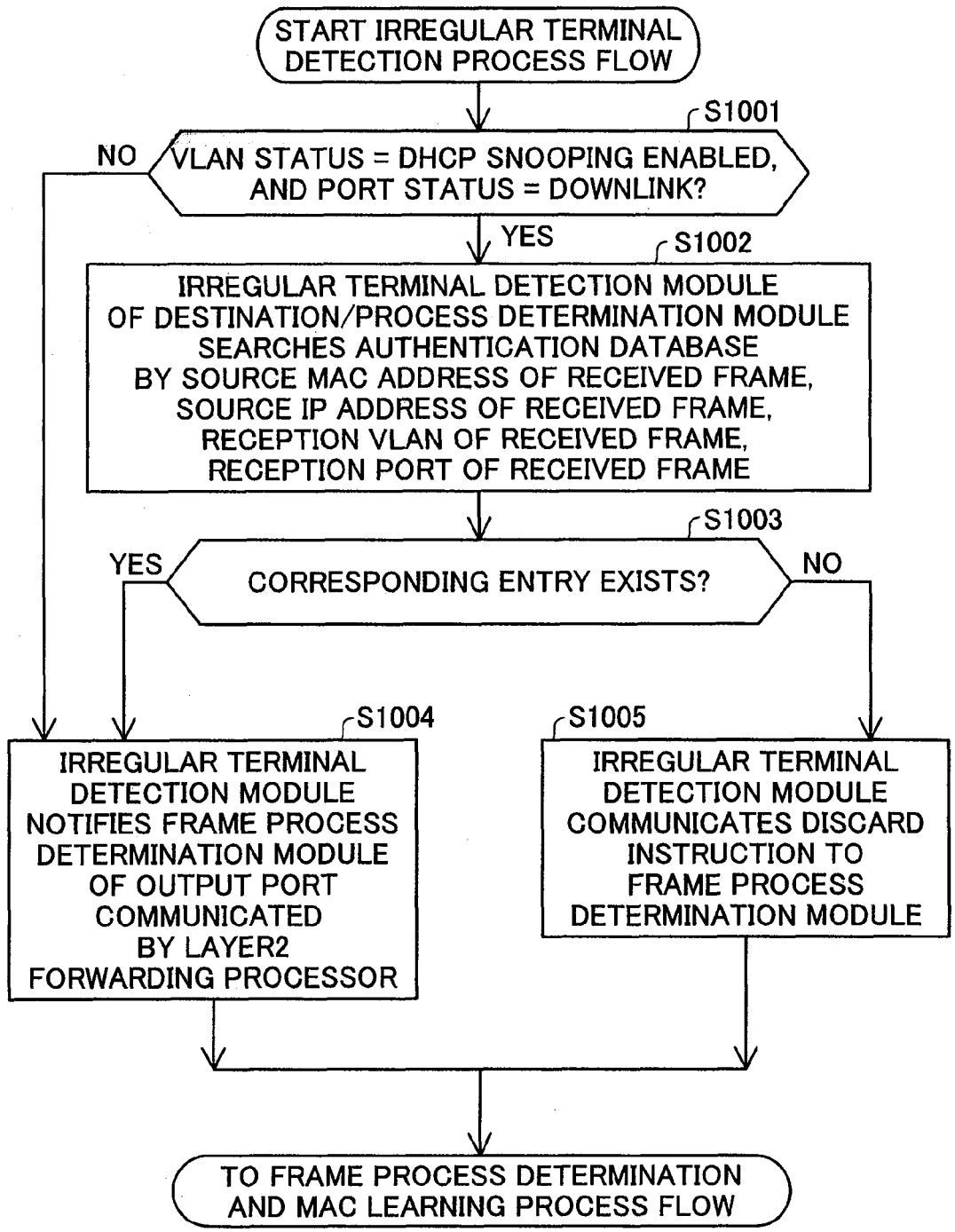
FIG. 11 is a first flowchart depicting the process flow of an irregular terminal detection process.

Irregular Terminal Detection Process:

FIG. 11 is a first flowchart depicting the process flow of an irregular terminal detection process. FIG. 11 illustrates the irregular terminal detection process flow in a case where the target frame data 800 is an IP packet.

First, it is determined whether the VLAN status is DHCP snooping enabled, and whether the port status of the reception port is downlink (Step S1001). In the event that that VLAN status is DHCP snooping enabled, and additionally the port status of the reception port is downlink (Step S1001: YES), the irregular terminal detection module 470 of the destination/process determination module 400 searches the authentication database 471 by the target frame data 800 source MAC address, source IP address, assigned VLAN, and reception port (Step S1002). Where the authentication database 471 search result indicates that a corresponding entry exists (Step S1003: YES) and that VLAN status is DHCP snooping disenabled or the port status of the reception port is uplink (Step S1001: NO), the irregular terminal detection module 470 communicates to the frame process determination module 480 the output port that was previously communicated to it by the layer 2 forwarding processor 460 (Step S1004). If on the other hand, the search result indicates that no corresponding entry exists (Step S1003: NO), the irregular terminal detection module 470 communicates a discard instruction to the frame process determination module 480 (Step S1005).

Figure 12:
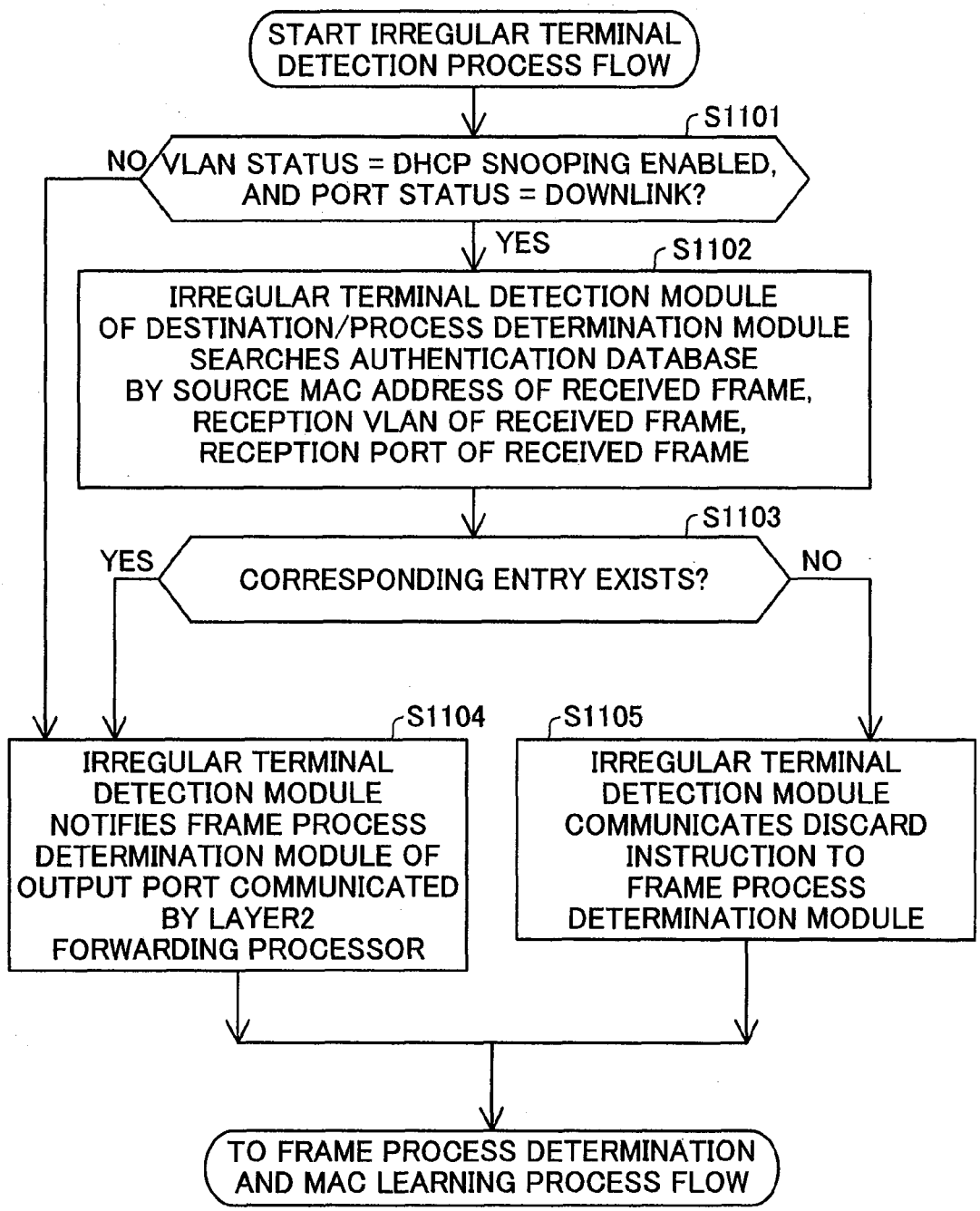
FIG. 12 is a second flowchart depicting the process flow of the irregular terminal detection process.

FIG. 12 is a second flowchart depicting the process flow of the irregular terminal detection process. FIG. 12 illustrates the irregular terminal detection process flow in a case where the target frame data 800 is a non-IP packet. First, it is determined whether the VLAN status is DHCP snooping enabled, and whether the port status of the reception port is downlink (Step S1101). In the event that that VLAN status is DHCP snooping enabled, and additionally the port status of the reception port is downlink (Step S1101: YES), the irregular terminal detection module 470 of the destination/process determination module 400 searches the authentication database 471 by the target frame data 800 source MAC address, assigned VLAN, and reception port (Step S1102). Where the authentication database 471 search result indicates that a corresponding entry exists (Step S1103: YES), and that VLAN status is DHCP snooping disenabled or that the port status of the reception port is uplink (Step S1101: NO), the irregular terminal detection module 470 communicates to the frame process determination module 480 the output port that was previously communicated to it by the layer 2 forwarding processor 460 (Step S1104). If the authentication database 471 search result indicates that no corresponding entry exists (Step S1103: NO), the irregular terminal detection module 470 communicates a discard instruction to the frame process determination module 480 (Step S1105).

Figure 13:
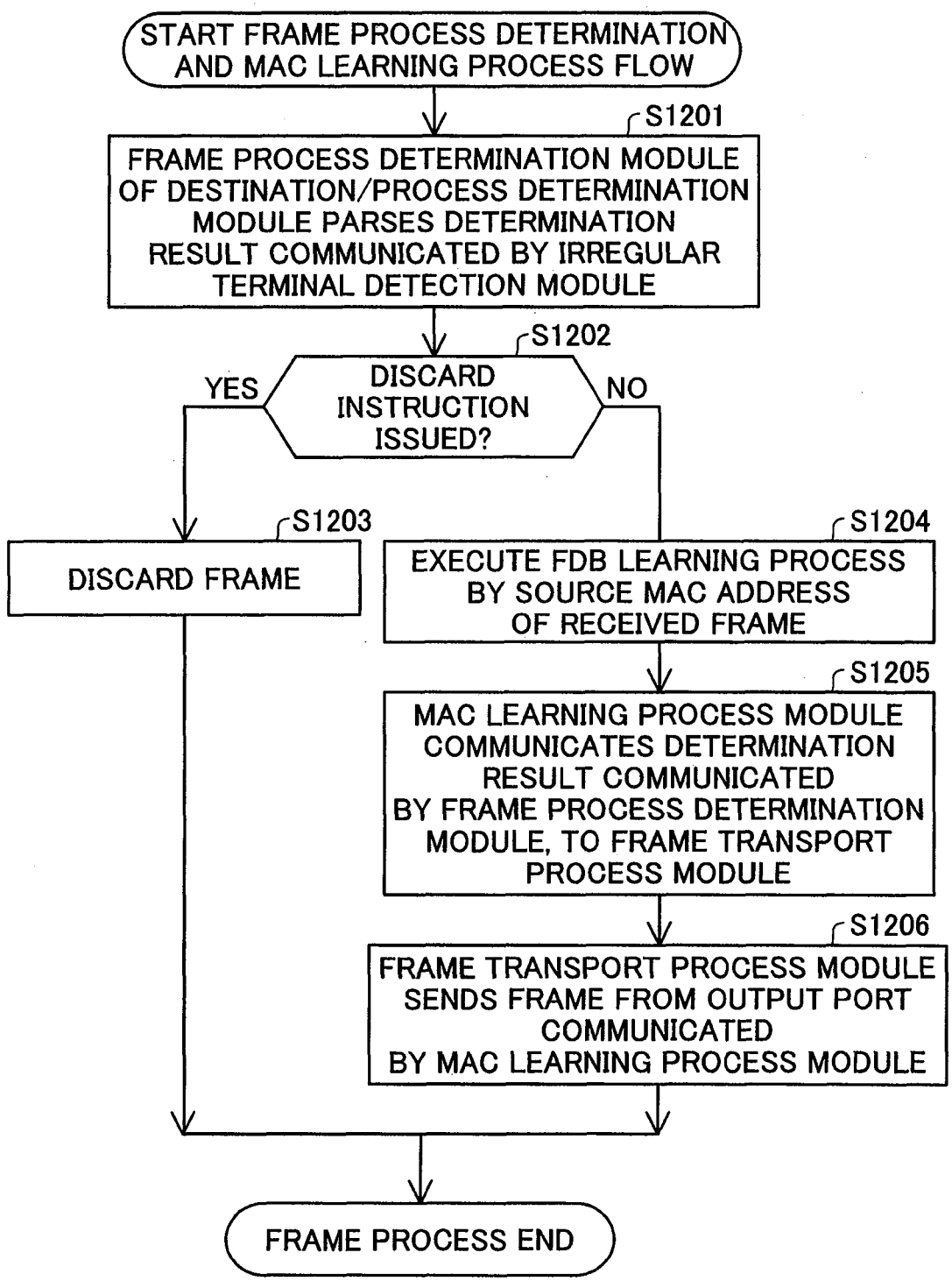
FIG. 13 is a flowchart depicting process steps by the frame process determination module 480 and the MAC address learning processor 490.

FIG. 13 is a flowchart depicting process steps by the frame process determination module 480 and the MAC address learning processor 490. The frame process determination module 480 of the destination/process determination module 400 parses the determination result communicated to it by the irregular terminal detection module 470 (Step S1201). If the result of parsing indicates a discard instruction (Step S1202: YES), the frame process determination module 480 discards the target frame data 800 (Step S1203). If on the other hand result of parsing does not indicate a discard instruction (Step S1202: NO), the MAC address learning processor 490 carries out an FDB learning process with the target frame data 800 source MAC address (Step S1204). Described in simple terms, the FDB learning process is a process for learning an association of the source MAC address with the port to which the device having the source MAC address is connected. Next, the MAC address learning processor 490 communicates to the frame transport processor 200 the determination result that was communicated to it by the frame process determination module 480 (Step S1205). The frame transport processor 200 then sends the target frame data 800 from the output port that was communicated to it by the MAC address learning processor 490 (Step S1206).

The network relay device SW1 described above can successfully prevent irregular communication in a situation where an irregular terminal whose IP address and MAC address have been manually set to addresses identical to those of a regular terminal which has been allocated an IP address by the DHCP server has surreptitiously connected to a different port of a network relay device or to a different VLAN. Thus, an irregular terminal that through packet sniffing or the like was able to acquire the IP address and MAC address of a terminal that was previously allocated an IP address by DHCP will not be able to connect to the network, even if its IP address has been manually set to one identical to a regular terminal, and its MAC address has been changed to one identical to a regular terminal.

Additionally, regardless of whether layer 3 transport or layer 2 transport is to be carried out on target frame data 800, irregular terminal detection will be carried out using a combination of the regular IP address $IP_{REG}$ (which is layer 3 information) together with the regular VLAN information $VL_{REG}$, the regular MAC address $MAC_{REG}$, and the regular port information $PO_{REG}$, so communication by an irregular terminal can be identified more carefully.

Moreover, by discarding frames of an irregular terminal so as to prevent the MAC address learning process, impaired communication of regular terminals due to communication by an irregular terminal can be prevented.

Embodiment 1 Modification Examples

In the present invention, the irregular terminal detection process is carried out on the basis of a process of allocating IP addresses to terminals by DHCP. However, the IP address allocation process is not limited to the DHCP protocol, and it is possible to adapt to various other technologies for allocating IP addresses to terminals through appropriate modification of the packet class determination module 430 and the protocol processor 300.

By designing the authentication database 471 to be set up through a user interface, it will also be possible with the detection method according to the present invention to detect irregular terminals in situations where terminal IP addresses are configured manually rather than by a technology that allocates IP addresses to terminals.

While the present embodiment describes an example of terminals that are allocated IPv4 IP addresses, detection of IPv6 irregular terminals is possible in analogous fashion.

B. Embodiment 2

The general configuration of the network system of Embodiment 2 is identical to the general configuration of the network system of Embodiment 1 described earlier with reference to FIG. 1, and as such will not be discussed. However, the network system of Embodiment 2 is provided with a network relay device SW1A in place of the network relay device SW1. Operation of the irregular terminal detection method which is a feature of Embodiment 2 takes place in the network relay device SW1A. The network relay device SW2 is a switch that lacks a filtering function for preventing irregular communication, and is simply connected for network layering purposes.

Figure 14:
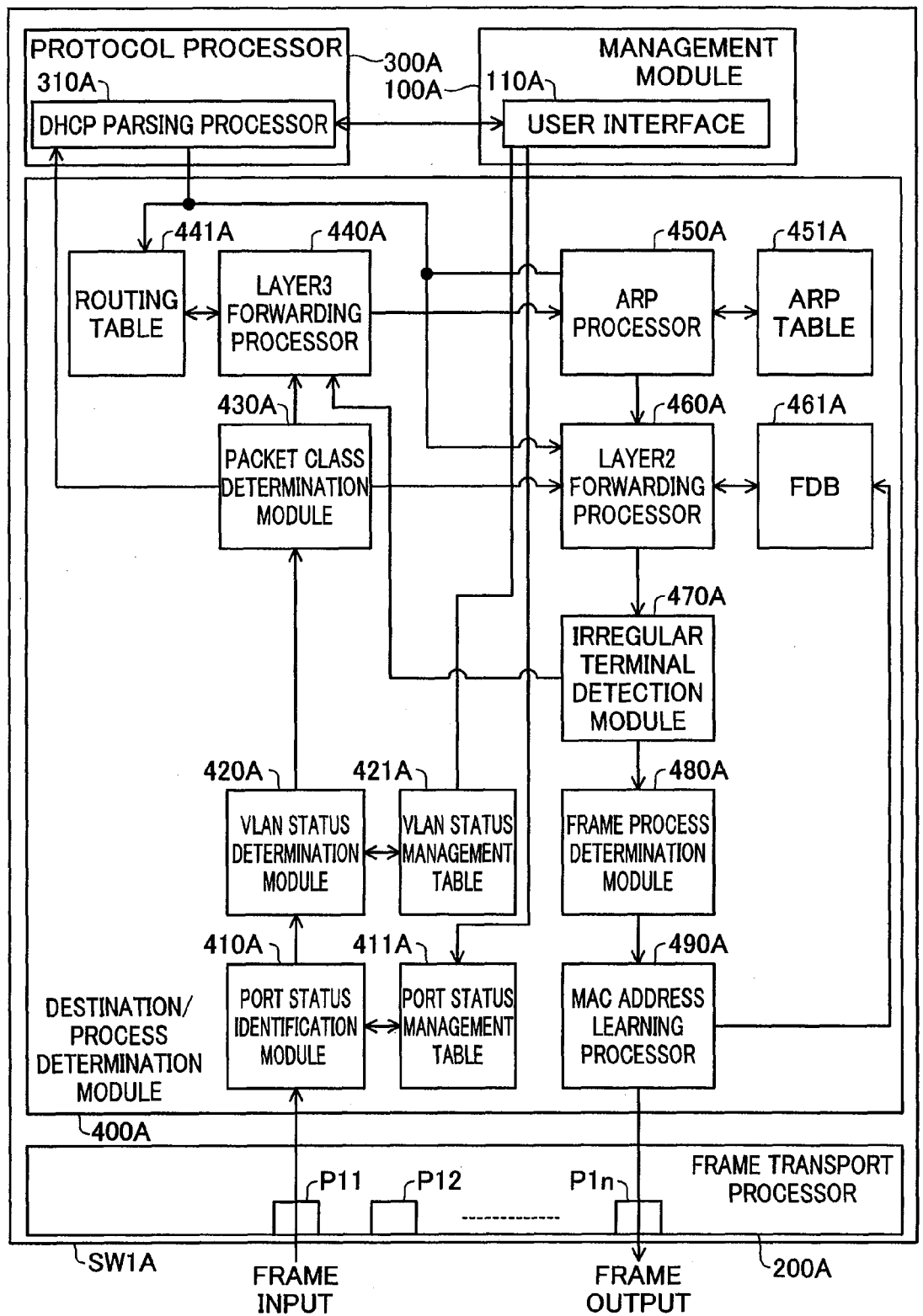
FIG. 14 is a block diagram depicting the configuration of the network relay device SW1A in Embodiment 2.

FIG. 14 is a block diagram depicting the configuration of the network relay device SW1A in Embodiment 2. The network relay device SW1A has a management module 100A, a frame transport processor 200A, a protocol processor 300A, and a destination/process determination module 400A. The management module 100A has a user interface 110A adapted to receive instructions from a user. The protocol processor 300A carries out processes relating to protocols such as routing protocols and ARP (Address Resolution Protocol); it will not be discussed in detail. The protocol processor 300A has a DHCP parsing processor 310A for carrying out processes relating to DHCP.

The destination/process determination module 400A includes a port status identification module 410A, a port status management table 411A, a VLAN status determination module 420A, a VLAN status management module 421A, a packet class determination module 430A, a layer 3 forwarding processor 440A, a routing table 441A, an ARP processor 450A, an ARP table 451A, a layer 2 forwarding processor 460A, an FDB 461A, an irregular terminal detection module 470A, a frame process determination module 480A, and a MAC address learning processor 490A.

Figure 15:
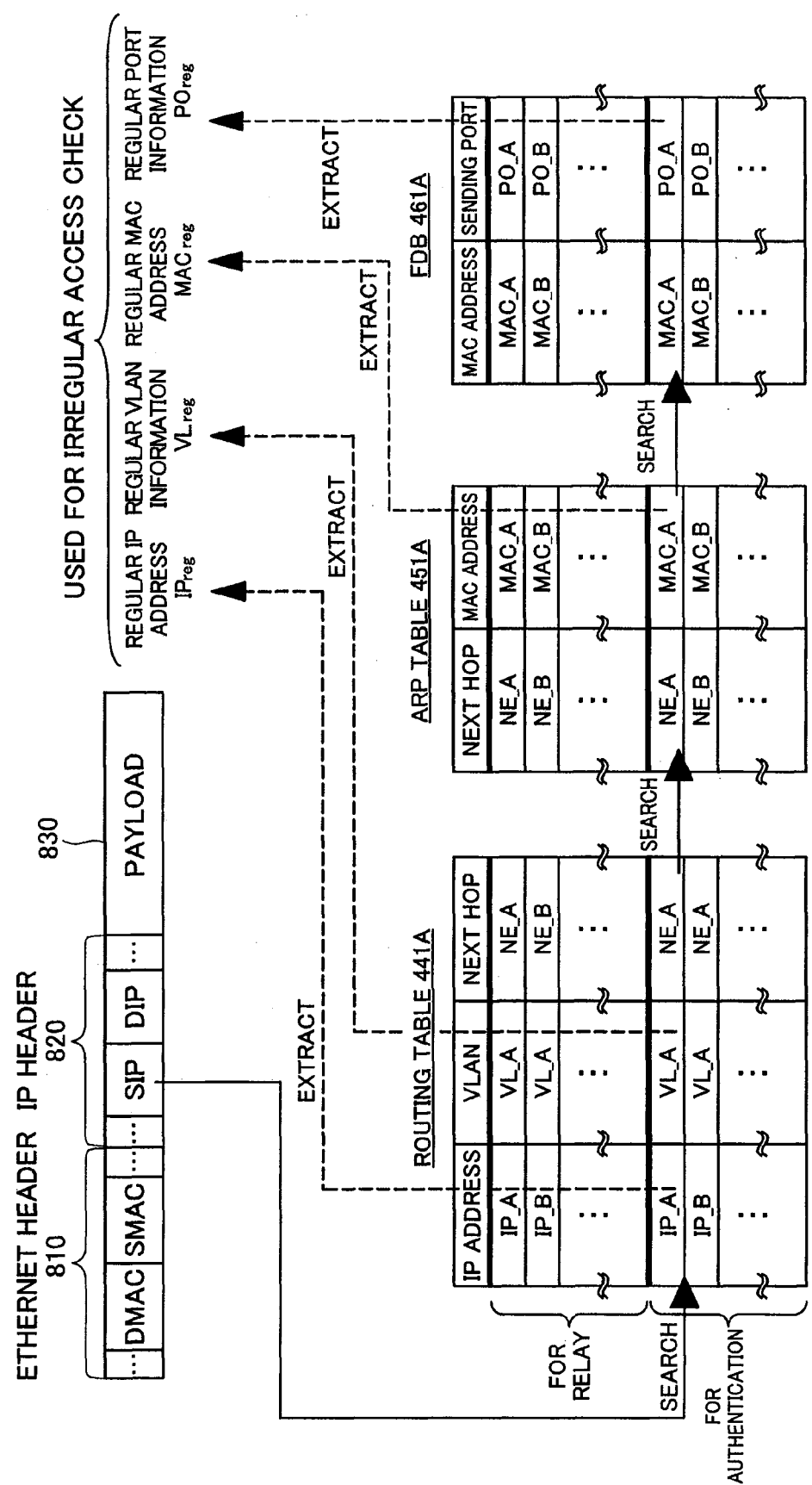
FIG. 15 is a diagram depicting in overview an irregular terminal detection method in Embodiment 2.

FIG. 15 is a diagram depicting in overview an irregular terminal detection method in Embodiment 2. Prior to describing the specific operations of the constituent elements of the network relay device SW1A mentioned above, a brief overview of the irregular terminal detection method will be presented. In Embodiment 1, regular terminal information is stored in the authentication database 471 which is an independent database; in Embodiment 2 however, regular terminal information is stored in relay lookup tables that the network relay device uses to identify transport destinations in normal transport processes. That is, a storing module for storing regular terminal information is provided within the relay lookup tables. The network relay device SW1A of Embodiment 2 is provided, as relay lookup tables, with a routing table 441A, an ARP table 451A, and an FDB 461A. In Embodiment 2, from the regular terminal information, the regular IP address $IP_{REG}$ and the VLAN information $VL_{REG}$ are stored in the routing table 441A. Also, from the regular terminal information, the regular MAC address $MAC_{REG}$ is stored in the ARP table 451A, while the regular port information $PO_{REG}$ is stored in the FDB 461A. These items of regular terminal information are stored in different areas (authentication areas) from areas where information used for transport processes (relay areas) is stored.

The transport areas and the authentication areas of the tables 441A, 451A, 461A are identified by flags stored in the tables, for example. During lookup for the purpose of a transfer process, reference is made to relay areas. The relay areas are managed by conventional functions such as routing protocol/ARP protocol/MAC learning etc. The authentication areas, on the other hand, are managed by the protocol processor 300A.

On the basis of the target frame data 800 source IP address, the network relay device SW1A searches the routing table 441A. If the target frame data 800 source IP address has been previously saved as a regular IP address $IP_{REG}$ in the routing table 441A, it is confirmed that the source IP address is a regular IP address $IP_{REG}$, and the regular VLAN information $VLAN_{REG}$ and the next hop are determined. The network relay device SW1 then searches the ARP table 451A on the basis of the next hop thusly determined. A regular MAC address $MAC_{REG}$ is determined as a result. The network relay device SW1A then searches the FDB 461A on the basis of the MAC address $MAC_{REG}$ thusly determined. Regular port information $PO_{REG}$ is determined as a result. That is, based on the target frame data 800 source IP address, the network relay device SW1A is able to extract the regular IP address $IP_{REG}$, the regular VLAN information $VLAN_{REG}$, the regular MAC address $MAC_{REG}$, and the regular port information $PO_{REG}$ as regular port information by sequentially searching the tables 441A, 451A, 461A.

The network relay device SW1A makes determinations as to whether target frame data 800 is regular data sent from a regular terminal, or irregular data send from an irregular terminal. Specifically, the network relay device SW1A determines whether the combination of the target frame data 800 source IP address, assigned VLAN, reception port, and source MAC address matches the extracted combination of regular terminal regular IP address $IP_{REG}$, regular VLAN information $VL_{REG}$, regular port information $PO_{REG}$, and regular MAC address $MAC_{REG}$. As in Embodiment 1, in the event that these combinations match, the network relay device SW1A designates the target frame data 800 as data sent from a regular terminal, and carries out the normal transport process. On the other hand, in the event that these combinations do not match, the network relay device SW1A designates the target frame data 800 as having been sent by an irregular terminal, and discards it.

Following is a description of specific operations of the network relay device SW1A of Embodiment 2. With the exception of the irregular terminal detection process, operations of the network relay device SW1A are comparable to those of the network relay device SW1 of Embodiment 1; therefore, only the irregular terminal detection process will be discussed below.

Figure 16:
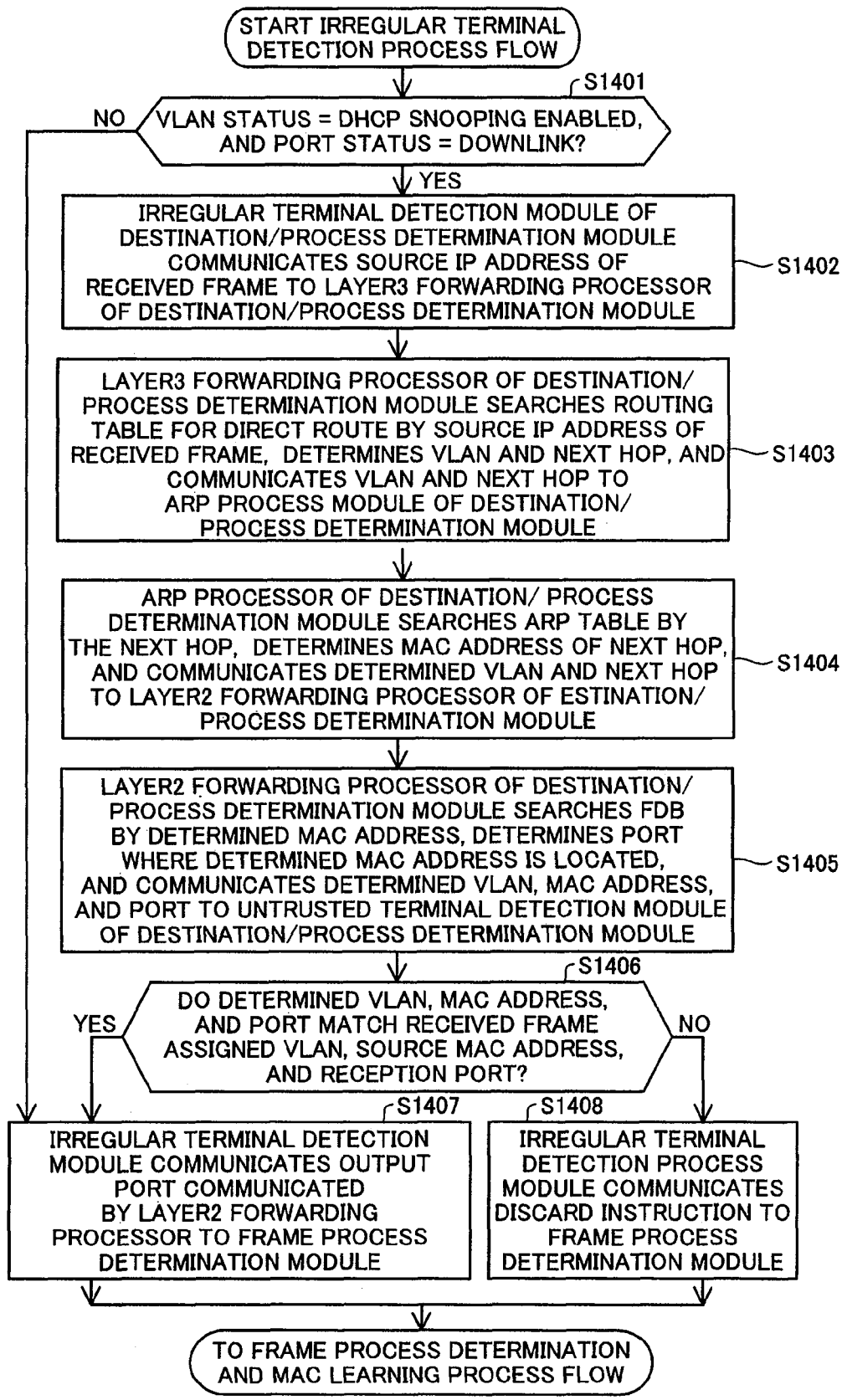
FIG. 16 is a first flowchart depicting the process steps of an irregular terminal detection process in Embodiment 2.

Irregular Terminal Detection Process:

FIG. 16 is a first flowchart depicting the process steps of an irregular terminal detection process in Embodiment 2. FIG. 16 illustrates the irregular terminal detection process flow in a case where the received frame is an IP packet.

First, it is determined whether the VLAN status is DHCP snooping enabled, and whether the port status of the reception port is downlink (Step S1401). In the event that that VLAN status is DHCP snooping enabled, and additionally the status of the reception port is downlink (Step S1401: YES), the irregular terminal detection module 470A of the destination/process determination module 400A communicates the received frame source IP address to the layer 3 forwarding processor 440A of the destination/process determination module 400A (Step S1402). Next, the layer 3 forwarding processor 440A of the destination/process determination module 400A searches by the received frame source IP address for a direct route in the authentication area of the routing table 441A; then determines the VLAN and the next hop, and communicates the VLAN and the next hop to the ARP processor 450A of the destination/process determination module 400A (Step S1403). The VLAN information communicated here is regular VLAN information $VL_{REG}$. The ARP processor 450A of the destination/process determination module 400A then searches the ARP table 451A by the previously determined next hop; then determines the MAC address that corresponds to the next hop, and communicates the aforementioned VLAN (regular VLAN information $VL_{REG}$) and the MAC address thusly determined to the layer 2 forwarding processor 460A of the destination/process determination module 400A (Step S1404). The MAC address communicated here is a regular MAC address $MAC_{REG}$. The layer 2 forwarding processor 460A of the destination/process determination module 400A searches the FDB 461A by the previously determined VLAN (regular VLAN information $VL_{REG}$) and the previously determined MAC address (regular MAC address $MAC_{REG}$); then determines the port that corresponds to the MAC address, and communicates the aforementioned VLAN (regular VLAN information $VL_{REG}$), the MAC address (regular MAC address $MAC_{REG}$), and the port thusly determined to the irregular terminal detection module 470A of the destination/process determination module 400A (Step S1405). The port information that is communicated here is regular port information $PO_{REG}$.

Next, it is determined whether the aforementioned VLAN (regular VLAN information $VL_{REG}$), the MAC address (regular MAC address $MAC_{REG}$), and the previously determined port (regular port information $PO_{REG}$) match the assigned VLAN, source MAC address, and reception port of the target frame data 800. If the determination is that they match (Step S1406: YES), and either the VLAN status is DHCP snooping disabled or the port status of the reception port is uplink (Step S1401: NO), the irregular terminal detection module 470A communicates to the frame process determination module 480A the output port that was communicated to it from the layer 2 forwarding processor 460A (Step S1407). If the determination is that they do not match (Step S1406: NO), the irregular terminal detection module 470A communicates to the frame process determination module 480A a discard instruction (Step S1408).

Figure 17:
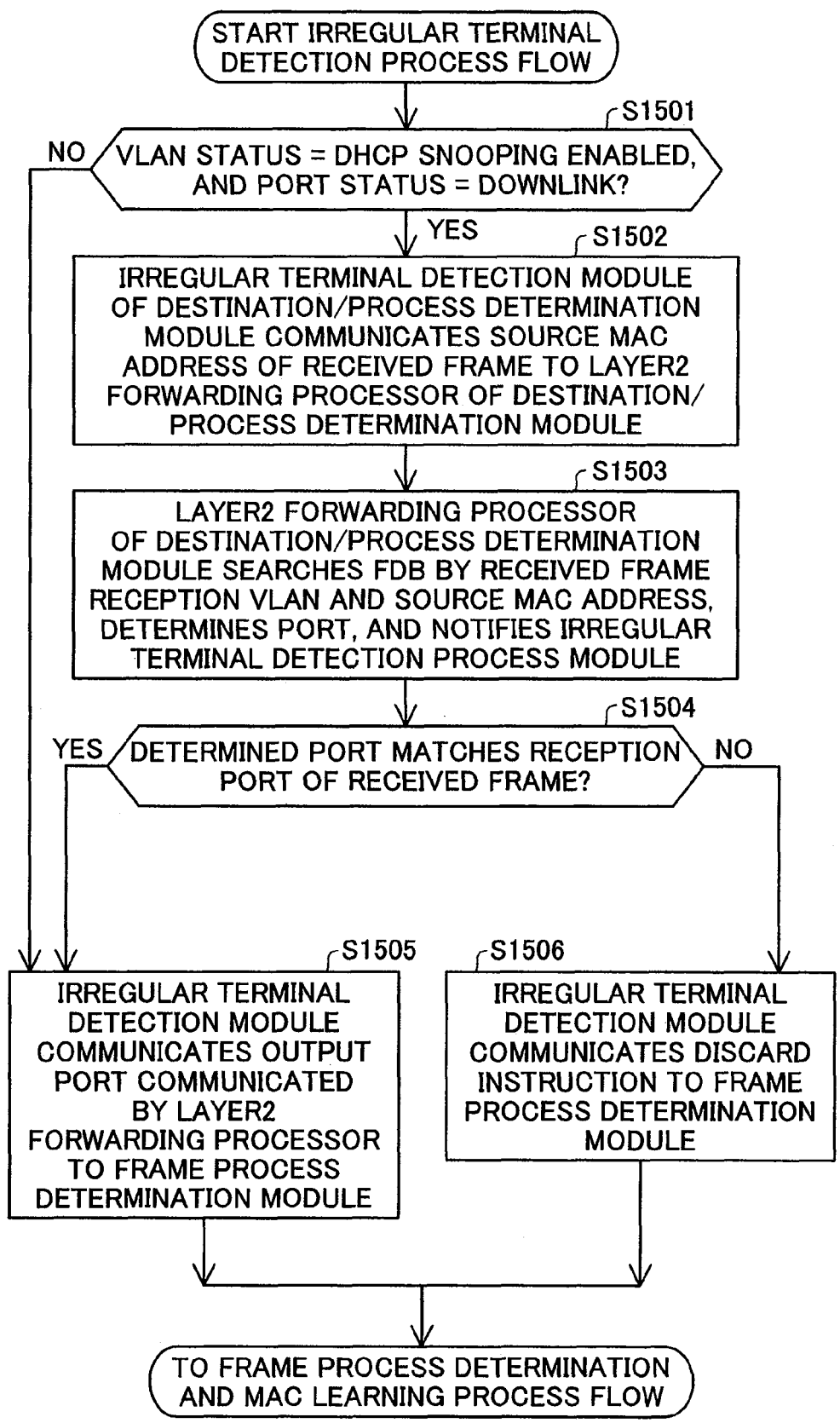
FIG. 17 is a second flowchart depicting the process steps of the irregular terminal detection process in Embodiment 2.

FIG. 17 is a second flowchart depicting the process steps of the irregular terminal detection process in Embodiment 2. FIG. 17 illustrates the irregular terminal detection process flow in a case where the received frame is a non-IP packet. First, it is determined whether the VLAN status is DHCP snooping enabled, and whether the port status of the reception port is downlink (Step S1501). In the event that that VLAN status is DHCP snooping enabled, and additionally the status of the reception port is downlink (Step S1501: YES), the irregular terminal detection module 470A of the destination/ process determination module 400A communicates the received frame source MAC address to the layer 2 forwarding processor 460A of the destination/process determination module 400A (Step S1502). The layer 2 forwarding processor 460A of the destination/process determination module 400A searches the FDB 461A by the reception VLAN and source MAC address, then determines the port and communicates this to the irregular terminal detection module 470A (Step S1503). The port information communicated here is regular port information $PO_{REG}$. Next, it is determined whether the communicated regular port information $PO_{REG}$ matches the reception port of the target frame data 800. If they are determined to match (Step S1504: YES), in the event that the VLAN status is DHCP snooping disabled, or the port status of the reception port is uplink (Step S1501: NO), the irregular terminal detection module 470A communicates the output port that was communicated to it from the layer 2 forwarding processor 460A, to the frame process determination module 480A (Step S1505). If they are determined to not match, (Step S1504: NO) the irregular terminal detection module 470A communicates a discard instruction to the frame process determination module 480A (Step S1506).

The network relay device SW1A according to Embodiment 2 described above affords working effects comparable to those of the network relay device SW1 of Embodiment 1.

Additionally, the network relay device SW1A of Embodiment 2 obviates the need for the authentication database 471 that was required in Embodiment 1. A simpler design for the network relay device SW1A can thus be attained through a reduced number of parts, smaller required memory capacity, and so on. Also, the memory capacity of the network relay device SW1A can be effectively utilized, for example, by being used for other purposes.

In Embodiment 2 it is possible for some processes to be utilized in common with an existing uRPF function. Specifically, the function of path search by source IP address could be utilized in common. Thus, if operated simultaneously with the uRPF function, the function activation frequency of network process LSI will be lower than where the two functions operate independently, which will provide advantages in terms of energy conservation as well.

Embodiment 2 Modification Examples

In the present invention, the irregular terminal detection process is carried out on the basis of a process of allocating IP addresses to terminals by DHCP. However, the IP address allocation process is not limited to the DHCP protocol, and it is possible to adapt to various other technologies for allocating IP addresses to terminals through appropriate modification of the packet class determination module 430A and the protocol processor 300A. By designing the routing table 441A, the ARP table 451A, and the FDB 461A so as to be set up through a user interface, using the detection method according to the present invention, it is also possible to detect irregular terminals in situations where terminal IP addresses are configured manually rather than by a technology that allocates IP addresses to terminals. Additionally, while the present embodiment describes an example of terminals that are allocated IPv4 IP addresses, detection of IPv6 irregular terminals is possible in analogous fashion.

C. Embodiment 3

Figure 18:
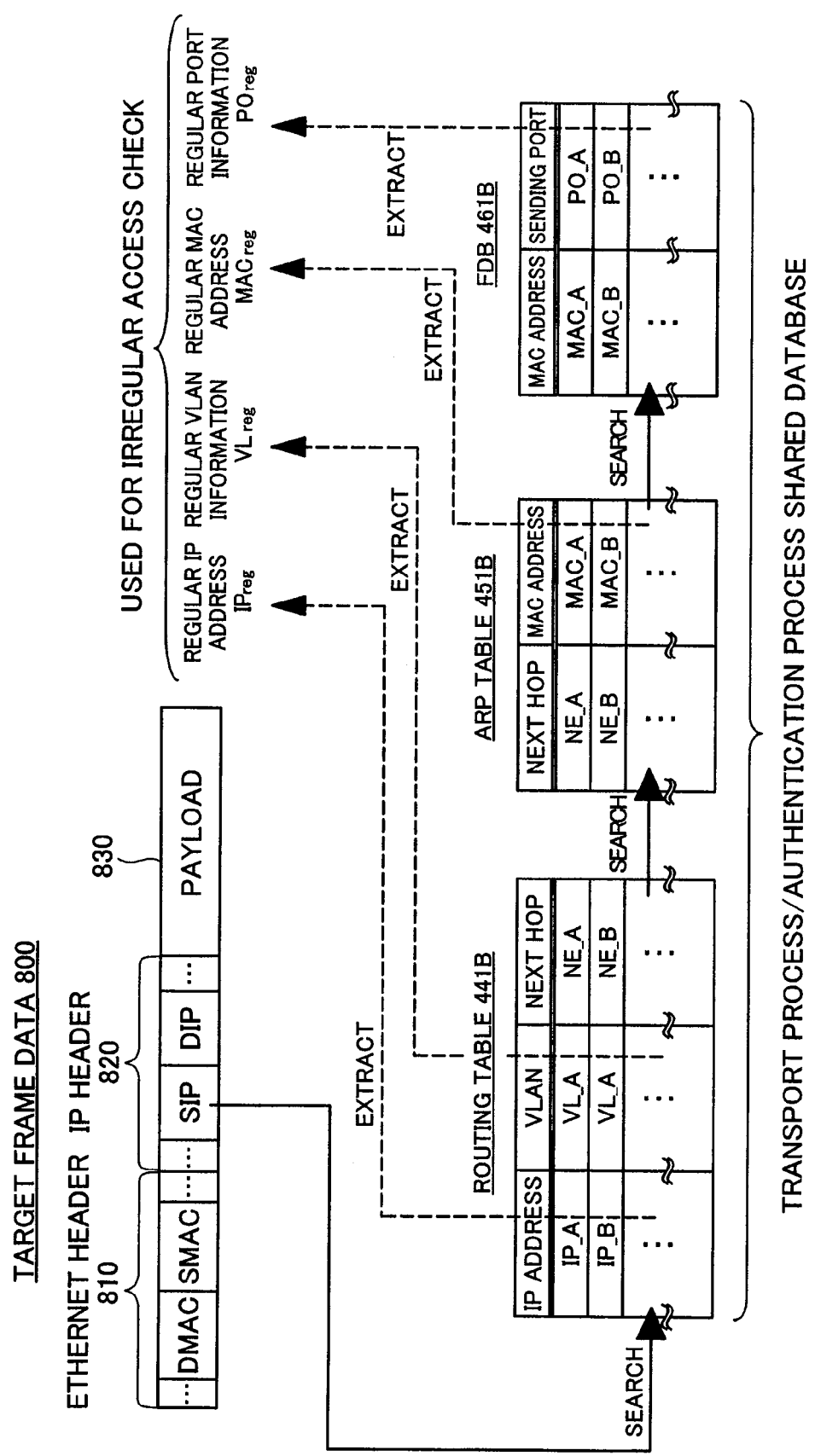
FIG. 18 is an illustration depicting an overview of Embodiment 3.

FIG. 18 is an illustration depicting an overview of Embodiment 3. As in Embodiment 2, where regular terminal information is stored in the routing table 441A, the ARP table 451A, and the FDB 461A, management of the tables requires congruity with existing control functions. Specifically, it is necessary for there to be congruity between the routing protocol that manages the routing table 441A, the ARP protocol that manages the ARP table 451A, the MAC learning process function that manages the FDB 461, and the irregular terminal detection function. As depicted in FIG. 15, in Embodiment 2, each of the tables 441A, 451A, 461A is provided with an authentication area; regular terminal information is registered therein separately from the relay area used for managing other control functions, with the authentication area being managed by the irregular terminal detection function. In Embodiment 3, instead, no authentication area is provided, and regular terminal information is stored in the relay area in the same way as information for relay purposes. For entries described by regular terminal information in the tables 441B, 451B, 461B, the irregular terminal detection function manages the entry from the time that the entry is stored until it is deleted. Other processes, such as the irregular terminal detection process, are comparable to those in Embodiment 2 and will not be described.

Embodiment 3 described above affords working effects comparable to those of Embodiment 2. Additionally, since the tables 441A, 451A, 461A are not provided with an authentication area, the memory capacity needed by the 441A, 451A, 461A can be reduced.

D. Modified Embodiments

Modified Embodiment 1

In the preceding embodiments, it is presumed that the network relay devices SW1, SW1A are switches for carrying out layer 3 transport; however, the present invention may be implemented in a router instead. The network relay devices SW1, SW1A may also be layer 2 switches for carrying out layer 2 transport. Even where the device is a layer 2 switch, in preferred practice, irregular terminal detection will be carried out based on a combination of the layer 3 information regular IP address $IP_{REG}$ with VLAN information $VL_{REG}$, regular MAC address $MAC_{REG}$, and regular port information $PO_{REG}$.

Modified Embodiment 2

In the preceding embodiments, the MAC address is employed as the layer 2 (data link layer) address, and the IP address is employed as the layer 3 (network layer) address; however, this is because the network connecting the various devices in the embodiments employs the Ethernet (TM) standard as the data link layer protocol, and IP (Internet Protocol) as the network layer protocol. Of course, where other protocols are employed as the protocols for the data link layer and the network layer, the addresses employed in these protocols may be used. In this case, the data for transfer would be data used by the protocol of the data link layer, rather than Ethernet frames.

Modified Embodiment 3

In the preceding embodiments, the frame transport processor 200, the protocol processor 300, the management module 100, and the destination/process determination module 400 are constituted so as to be included in a single unit case. However, some of these constituent elements may instead be provided separately to several unit cases. For example, the management module 100 and the protocol processor 300 may be provided as separate control management devices. Alternatively, several network relay devices may be connected by cables, and a single network relay device SW1, SW1A may be composed of several network relay devices. In this case, the aforementioned irregular terminal detection function may be provided to some or all of the several network relay devices that make up the network relay device SW1, SW1A.

Modified Embodiment 4

Some of the arrangements which have been implemented through hardware in the preceding embodiments and modified embodiments may instead be implemented through software, and conversely some of the arrangements which have been implemented through software may instead be implemented through hardware.

Modified Embodiment 5

In the preceding embodiments, frames that are determined to be target frame data 800 sent by an irregular terminal are discarded; however, they may instead be forwarded to an irregular frame data analysis unit or the like.

What is claimed is:

1. A network relay device for relaying communication for a regular terminal via a port, comprising:
   an acquiring module configured to acquire a regular layer 2 address representing a layer 2 address allocated to the regular terminal, a regular layer 3 address representing a layer 3 address allocated to the regular terminal, regular VLAN information representing a VLAN assigned to the regular terminal, and regular port information representing a port to which the regular terminal is connected;
   one or a plurality of relay lookup tables which identifies, based on a destination layer 3 address of target frame data, among the ports, an output port that outputs the target frame data and includes a regular terminal information storing module for authentication configured to store regular terminal information representing a combination of the acquired regular layer 2 address, the regular layer 3 address, the regular VLAN information, and the regular port information; and
   a determination process module configured to determine whether the combination of source layer 2 address, source layer 3 address, assigned VLAN, and reception port of target frame data received via the port is stored as the regular terminal information in the regular terminal information storing module included in the relay lookup table,
   wherein the regular terminal information stored in the regular terminal information storing module provided within the one or plurality of relay lookup tables is stored in different areas from areas where information used for transport processes is stored in the relay lookup table.

2. The network relay device according to claim 1, further comprising:
   a transport process module configured to execute transport of the target frame data when the combination is determined, through the determination, to have been stored as the regular terminal information in the regular terminal information storing module; and not to execute transport of the target frame data when the combination is determined to have not been stored as the regular terminal information in the regular terminal information storing module.

3. The network relay device according to claim 1, wherein the acquiring module acquires the regular layer 2 address, the regular layer 3 address, the regular VLAN information, and the regular port information through monitoring DHCP frame that is frame data sent and received between the regular terminal and a DHCP server via the port.

4. The network relay device according to claim 3, wherein the target frame data is frame data other than the DHCP frame.

5. The network relay device according to claim 1, wherein the determination is executed irrespective of whether the target frame data is targeted for layer 3 transport or targeted for layer 2 transport.

6. The network relay device according to claim 1, wherein a process of learning the source layer 2 address is carried out for the target frame data that is determined to have been stored as the regular terminal information in the regular terminal information storing module, and a process of learning the source layer 2 address is not be carried out for the target frame data that is determined to have not been stored as the regular terminal information in the regular terminal information storing module.

7. The network relay device according to claim 1, wherein the one or plurality of relay lookup tables include at least one of:
a layer 3 routing table that relates a source layer 3 address with a next hop and an assigned VLAN;
a layer 2 address lookup table that relates the next hop with a layer 2 address; and
a port lookup table that relates the layer 2 address with the output port;
and wherein
the regular layer 3 address and the regular VLAN information within the regular terminal information are stored in the layer 3 routing table;
the regular layer 2 address within the regular terminal information is stored in the layer 2 address lookup table;
the regular port information within the regular terminal information is stored in the port lookup table; and
wherein the determination process module extracts the regular VLAN information, the regular layer 2 address, and the regular port information corresponding to the regular layer 3 address through sequential lookup in the layer 3 routing table, the layer 2 address lookup table, and the port lookup table, based on the regular layer 3 address.

8. The network relay device according to claim 7, wherein the determination process module determines whether the combination of the source layer 2 address, assigned VLAN, and reception port of the target frame data is stored as the regular terminal information when the target frame data lacks a source layer 3 address.

9. The network relay device according to claim 1, wherein the layer 3 address is an IP address.

10. The network relay device according to claim 1, wherein the layer 2 address is a MAC address.

11. A network relay method for relaying communication for a regular terminal via a port, comprising the steps of:
(a) acquiring a regular layer 2 address representing a layer 2 address allocated to the regular terminal, a regular layer 3 address representing a layer 3 address allocated to the regular terminal, regular VLAN information representing a VLAN assigned to the regular terminal, and regular port information representing a port to which the regular terminal is connected;
(e) providing one or a plurality of relay lookup tables for identifying, based on a destination layer 3 address of target frame data, among the ports, an output port that outputs the target frame data;
(b) storing, into the relay lookup table, regular terminal information for authentication representing a combination of the acquired regular layer 2 address, the regular layer 3 address, the regular VLAN information, and the regular port information, and managing the regular terminal; and
(c) determining whether the combination of source layer 2 address, source layer 3 address, assigned VLAN, and reception port of target frame data received via the port is stored as the regular terminal information,
wherein the storing step is a step of storing the regular terminal information into different areas from areas where information used for transport processes is stored within the one or plurality of relay lookup tables.

12. The network relay method according to claim 11, further comprising:
(d) executing transport of the target frame data only when the combination is determined, through the determining step, to have been stored as the regular terminal information.

13. The network relay method according to claim 11, wherein
the acquiring step is a step of acquiring the regular layer 2 address, the regular layer 3 address, the regular VLAN information, and the regular port information through monitoring DHCP frame that is frame data sent and received between the regular terminal and a DHCP server via the port.

14. The network relay method according to claim 13, wherein
the target frame data is frame data other than the DHCP frame.

15. The network relay method according to claim 11, wherein
the determining step is executed irrespective of whether the target frame data is targeted for layer 3 transport or targeted for layer 2 transport.

16. The network relay method according to claim 11, wherein
a process of learning the source layer 2 address is carried out for the target frame data that is determined to have been stored as the regular terminal information, and
a process of learning the source layer 2 address is not be-carried out for the target frame data that is determined to have not been stored as the regular terminal information.

17. The network relay method according to claim 11, wherein
the one or plurality of relay lookup tables include:
a layer 3 routing table that relates a source layer 3 address with a next hop and an assigned VLAN;
a layer 2 address lookup table that relates the next hop with a layer 2 address; and
a port lookup table that relates the layer 2 address with the output port;
and wherein
the regular layer 3 address and the regular VLAN information within the regular terminal information are stored in the layer 3 routing table;
the regular layer 2 address within the regular terminal information is stored in the layer 2 address lookup table;
the regular port information within the regular terminal information is stored in the port lookup table; and
the determining step extracts the regular VLAN information, the regular layer 2 address, and the regular port information corresponding to the regular layer 3 address through sequential lookup in the layer 3 routing table, the layer 2 address lookup table, and the port lookup table, based on the regular layer 3 address.

18. The network relay method according to claim 17, wherein
the determining step is a step of determining whether the combination of the source layer 2 address, assigned VLAN, and reception port of the target frame data is stored as the regular terminal information when the target frame data lacks a source layer 3 address.

* * * * *